United States Patent [19]

Asplund

[11] 4,333,137
[45] Jun. 1, 1982

[54] THYRISTOR SWITCH WITH TRANSIENT PROTECTION AND RF INTERFERENCE SUPPRESSION

[75] Inventor: Gunnar Asplund, Ludvika, Sweden
[73] Assignee: ASEA Aktiebolag, Sweden
[21] Appl. No.: 205,852
[22] Filed: Nov. 10, 1980
[30] Foreign Application Priority Data

Nov. 12, 1979 [SE] Sweden .............................. 7909314

[51] Int. Cl.³ ........................................ H02H 7/125
[52] U.S. Cl. ................................. 363/54; 307/252 L; 363/68
[58] Field of Search ..................... 307/252 L, 252 Q; 363/68, 137, 54

[56] References Cited

U.S. PATENT DOCUMENTS 3,405,346 10/1968 Krauthamer ................... 363/137 X
3,609,511 9/1971 Risberg .......................... 363/137 X
3,955,131 5/1976 Piccone et al. ........................ 363/68

OTHER PUBLICATIONS

The Brown Boveri Review, vol. 55, No. 7, Jul. 1968, p. 345.

Primary Examiner—William M. Shoop
Attorney, Agent, or Firm—Pollock, Vande Sande & Priddy

[57] ABSTRACT

A high voltage power converter has a number of thyristors interconnected. Symmetrical voltage dividers maintain equal voltage distribution across the thyristors. Each thyristor has a plurality of inductors associated therewith for reducing rapid current increases through the thyristors during firing which might injure the components and generate radio frequency interference.

6 Claims, 4 Drawing Figures

THYRISTOR SWITCH WITH TRANSIENT PROTECTION AND RF INTERFERENCE SUPPRESSION

FIELD OF THE INVENTION

The present invention relates to high voltage power converter valves utilizing thyristors, and more particularly to a voltage divider network for such thyristors which utilize inductors for limiting abrupt current increases in the converter circuitry during ignition of the thyristors.

BRIEF DESCRIPTION OF THE PRIOR ART

Thyristors are a well-known component for high voltage power converter applications. Arranging a voltage divider for attaining uniform voltage distribution between the thyristors of a converter switch is well established in the prior art. Such a voltage divider may consist of a series connection of a capacitor and a resistor which is, in turn, connected in parallel with each thyristor. During operation of high voltage thyristor valves, such as in the present application of a power converter, considerable radio frequency interference arises due to the generation of transient voltages and current occurring during thyristor switching. In high power converters, this interference is so great that special measures have hitherto been required to reduce the interference, such as by utilizing phase reactors in the AC leads of the converter and by utilizing electromagnetic screening of housings or rooms, where such converters are located. The generation of transient voltages due to external circumstances may cause the destruction of thyristors. For example, in the event of a ground fault, the thyristors may be subjected to steep voltage transients which may cause component failure. Similarly, in the case of overloading caused by lightning, transient voltages of extremely high amplitude may cause the destruction of the thyristors. In normal operation of the converter, a last firing thyristor or thyristors may be subjected to excessive voltage transients that will terminate the component's usefulness.

BRIEF DESCRIPTION OF THE PRESENT INVENTION

The present invention has as a primary object the minimization of radio frequency interference emitted by a power converter, due to the firing of thyristor components in such a converter. A further object of the invention is to maintain voltages at thyristor terminals at a reduced level during the occurrence of transients so that the thyristors will not be destroyed by the transients.

This is basically achieved in the present invention by utilization of a plurality of series-connected thyristors, in circuit with a voltage divider including resistor and capacitor components. At least one inductor is connected in circuit with each thyristor for limiting the current jump upon firing of the thyristor.

The above-mentioned objects and advantages of the present invention will be more clearly understood when considered in conjunction with the accompanying drawings, in which:

DETAILED DESCRIPTION OF THE INVENTION

Figure 1:
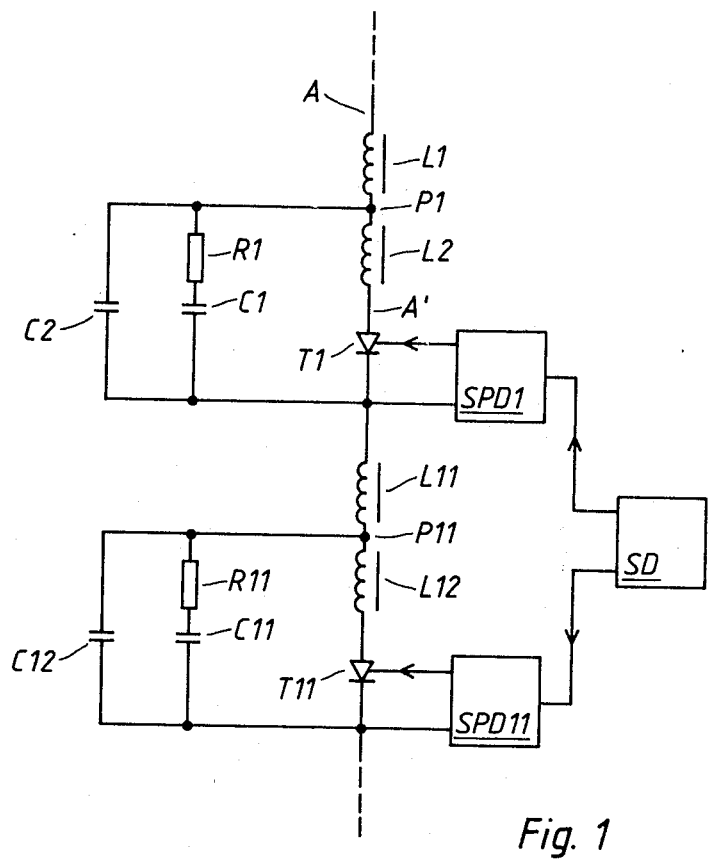
FIG. 1 is a block diagram of a portion of a power converter incorporating the present invention.

FIG. 1 shows two thyristors, T1 and T11, which are included in a high voltage valve which may comprise a large number of similarly connected series-connected thyristors. The thyristors T1 and T11 are provided with respective control units, SPD1 and SPD11, each of which is connected to the gate and the cathode of a corresponding thyristor. A control master SD, common to the thyristors T1 and T11 delivers a signal simultaneously to all the control units for firing the thyristors, each control unit then supplying a control current pulse to its respective thyristor. This described configuration including the control units and control master are well established prior art circuits.

Two inductors L1 and L2 are connected in series with the anode of thyristor T1. The voltage divider impedances R1, C1 and C2 are connected between the junction point P1 of the inductors and the cathode of the thyristor T11.

Thyristor T11 is also provided with two inductors L11 and L12 as well as with the voltage divider impedances R11, C11 and C12. In a similar manner, other thyristors would be connected in circuit with respective divider impedances.

The thyristors may also be provided, in a known manner, with further voltage divider impedances, for example for supplying the control units. Each thyristor may be connected in parallel with a relatively high resistance to obtain a uniform voltage division in case of pure direct voltage application.

In a conventional manner, the RC circuit R1-C1 attends to the voltage division during normal operation. The capacitor C1 is valued so that any non-uniformity in the voltage distribution between the thyristors becomes so small that switching faults will not occur in operation. The resistor R1 is valued so that the discharge current of the capacitor C1 upon firing of the thyristor is limited to a value that is not detrimental to the thyristor.

The inductor L1 and the capacitor C2 are valued so that the thyristor T1 is not subjected to an excessively steep voltage transient in the event of rapid voltage drops across the switch, nor in the event that a particular thyristor is fired after the other thyristors in the valve. The capacitor C2, which is preferably not series-connected to a resistance, may suitably be given a low capacitance, which reduces the quantity of charge which flows from the capacitor through the thyristor upon firing thereof. This is also in agreement with the object of the capacitor to dampen high frequency voltage components. The capacitor C2 may, for example, be given a capacitance which is of the order of magnitude of 1 to 10 percent of the capacitance of the capacitor C1.

The inductor L2 limits the discharging current of the capacitor C2 upon firing of the thyristor.

When the valve is ignited, a rapid charging of a number of undampened capacitances occurs in the vicinity of the valve (e.g., stray capacitances). The inductors L1 and L2 are valued so that these otherwise high currents are limited to a harmless level.

Figure 2:
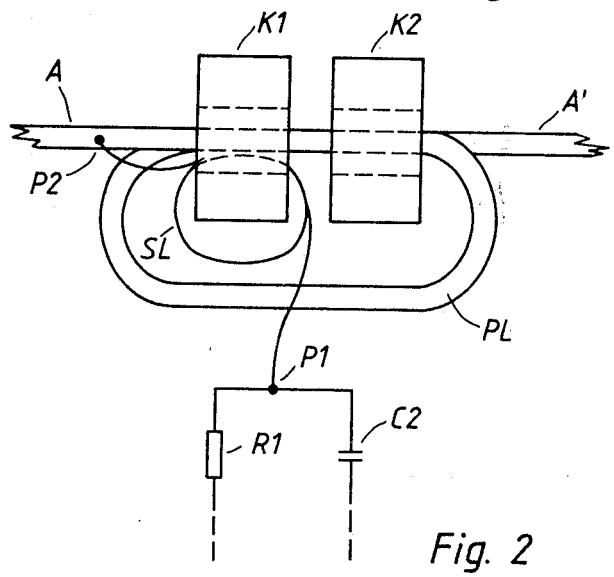
FIG. 2 is a schematic illustration showing two inductors, connected to each thyristor, as shown in the block diagram of FIG. 1.

FIG. 2 shows a preferred embodiment of the inductors L1 and L2. The anode lead A–A' of the thyristor (see also FIG. 1) is wound a suitable number of turns through two ring cores K1 and K2 and forms a primary winding PL. This winding together with the core K1 forms the inductor L1, and together with the core K2 the inductor L2. The inductances of the inductors are configured to desired values by the choice of core sizes and number of winding turns. The cores K1 and K2 may, for example, be equal, in which case the inductors will have the same inductance. The number of winding turns should be relatively low since the lead A–A' in typical cases is considerably thick. If the number of turns is greater than one, the inductors L1 and L2 will have no easily accessible point of connection for the impedance elements R1, C1, C2. Instead an artificial point of connection P1 is generated by means of a secondary winding SL wound around the core K1, which winding may be made of a relatively thin wire. One end of the secondary winding is connected to the conductor A–A' at a point P2 located outside the cores K1 and K2. Its other end constitutes the point of connection P1. If the secondary winding SL is made with the same number of winding turns and with the same direction of winding as the primary winding PL, the point P1 will always assume the same potential as the point of connection of the inductors would have assumed if the inductors had been made completely separate, that is with individual cores and windings.

Since conductor A–A' is normally considerably thick, the embodiment shown in FIG. 2 involves a considerable saving of space as compared with the alternative, similar embodiments in which the inductors are completely separate.

Figure 3:
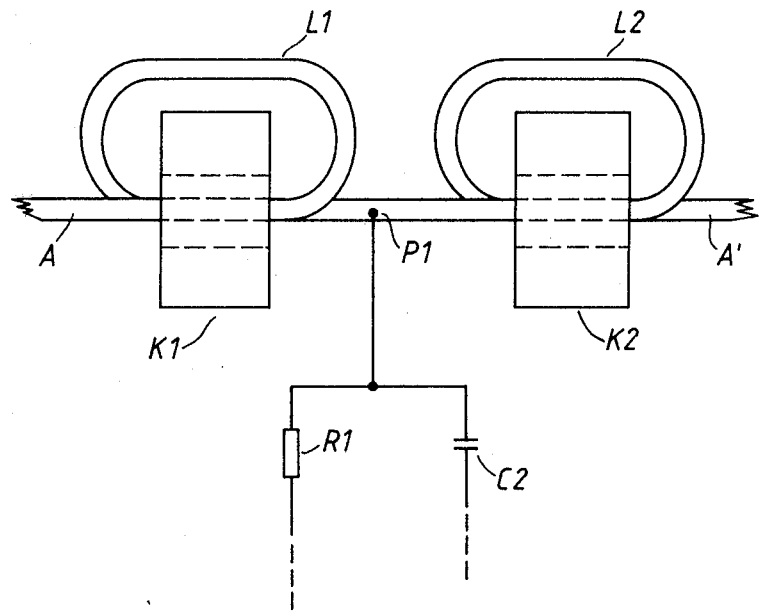
FIG. 3 is an alternate schematic showing of an inductor configuration connected with a thyristor.

An example of this latter embodiment is shown in FIG. 3, in which the conductor A–A' is wound through each core to form separate windings. This alternative is in general considerably more bulky than that shown in FIG. 2. In the case where the inductors only have one winding turn each (conductor A–A' then being fitted right through both cores), the alternative according to FIG. 2, however, entails no advantages since in that case the point of connection is easily accessible (a point on A–A' between the cores).

Figure 4:
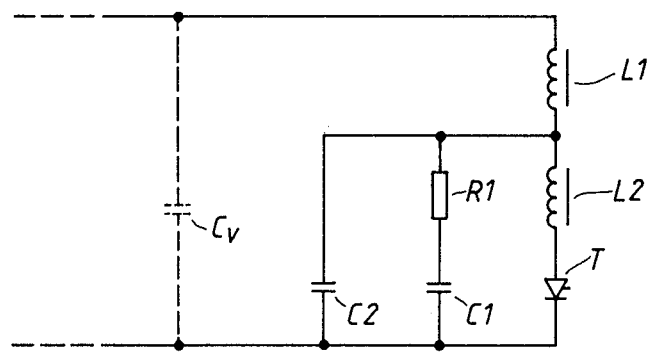
FIG. 4 is a partial schematic diagram illustrating the filtering of radio frequency interference from a power converter of the present type, such filtering occurring in two stages.

FIG. 4 shows a valve according to the invention, which schematically illustrates a single thyristor with series inductors and voltage divider elements according to FIG. 1. As regards attenuation of radio frequency interference, the diagram according to FIG. 4 is equivalent to a valve according to the invention along with external capacitance $C_v$. The thyristor may be regarded as a generator, which generates a radio frequency alternating voltage. This is filtered in two stages. The first stage consists of inductor L2 and capacitors C1 and C2 as well as resistor R1. The second stage consists of inductor L1 and the external capacitance $C_v$, which consists of lead-through capacitances, stray capacitances and other external capacitances. This two-stage filtering gives a considerably higher attenuation of the radio frequency interference, especially at higher frequencies, than a one-stage attenuation (i.e., with only one inductor) and the same quantity of iron is used in the cores in both cases. By carrying out filtering directly in the valve, external measures for eliminating interference (phase inductors, screening, etc.), which were necessary in the past, may be avoided and a considerable reduction of fabricating cost may be achieved.

In the figures, the inductors associated with a thyristor are connected to the anode of the thyristor, which results in a more simple supply of the control units, for example SPD1 via the voltage divider. Alternatively, however, the inductors may be connected to the other main electrode (the cathode) of the thyristor.

The above description describes how the voltage divider impedances R1 and C1 are connected between the cathode of the thyristor T1 and the point of connection of the inductors. This embodiment is preferable since R1 and C1 then contribute to attenuate voltage oscillations between C2 and L1. Alternatively, however, the series connected R1-C1 may be connected in parallel with both the thyristor and both the inductors, or possibly only with the thyristor.

It should be understood that the invention is not limited to the exact details of construction shown and described herein for obvious modifications will occur to persons skilled in the art.

I claim:

1. In a high voltage converter valve having at least a pair of thyristors, the improvement comprising:
    a first inductor serially connected in circuit with each corresponding thyristor for limiting the rate of current increase in the switch during thyristor firing;
    series connected resistor and first capacitor components connected in parallel across the outward leads of each serially connected thyristor and inductor, for providing equal voltage distribution between the thyristors;
    a second capacitor connected in parallel with each series connected resistor and first capacitor; and
    a second respective inductor connected in circuit with each corresponding first inductor and cooperating with stray capacitance for minimizing the generation of radio frequency interference signals from the switch.

2. A high voltage thyristor power converter valve having a plurality of interconnected valve sections capable of decreasing generated radio frequency interference and rate of current increase through the valve during thyristor firing, each switch section comprising:
    a thyristor connected in series with a first inductor;
    a resistor connected in series with a capacitor;
    means connecting the series connected resistor and capacitor in parallel with the series connected thyristor and inductor;
    a second capacitor connected in parallel with the serially connected thyristor and inductor; and
    a second inductor connected in series between an outward terminal of the first inductor and an output terminal of a thyristor in an adjacent switch section.

3. The subject matter of claim 2 wherein the first inductor is connected to the anode of the thyristor to complete the series connection therebetween.

4. The subject matter of claim 2 wherein the second capacitor has a capacitance substantially lower than the first.

5. The subject matter of claim 2 wherein each inductor includes a respective core and a common first winding therethrough, and further wherein a second winding is wound around one of the cores, the second winding being connected between the first winding and a junction point on the connecting means.

6. The subject matter set forth in claim 5 wherein the first and second windings have a turns ratio of unity.

* * * * *